Figure 1:
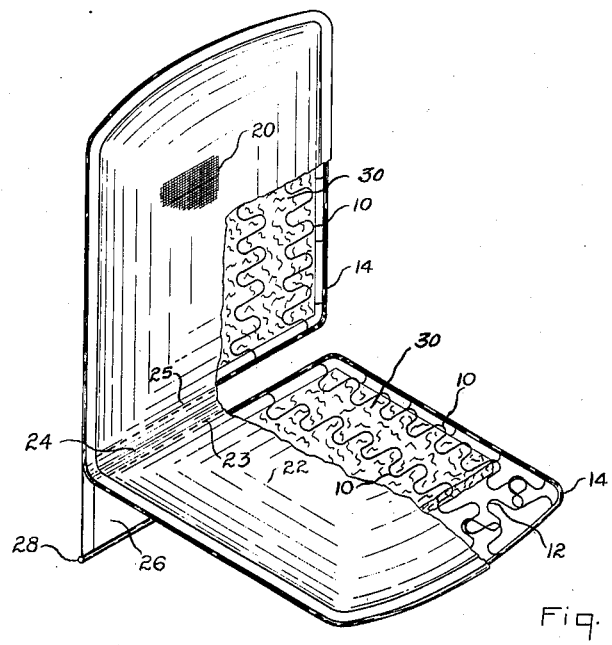

April 27, 1937.  N. E. MacEWAN  2,078,396
AUXILIARY SEAT
Filed May 13, 1936

Inventor
Norman E. MacEwan
By Beaman & Langford
Attorneys

Patented Apr. 27, 1937

2,078,396

UNITED STATES PATENT OFFICE 2,078,396

AUXILIARY SEAT

Norman E. MacEwan, Detroit, Mich.

Application May 13, 1936, Serial No. 79,428

1 Claim. (Cl. 155—182)

The present invention relates to improvements in portable auxiliary seats such as may be conveniently used in automobiles during warm weather or to render more comfortable seat construction as are found in baseball pavilions, public parks, etc.

Auxiliary seats have heretofore been proposed having ventilating characteristics for giving relief from the discomfort of heavy upholstered seats of automobiles during warm weather. It is an object of the present invention, however, to provide an auxiliary seat which is considered to have substantially improved inherent ventilating properties over similar constructions that have made their appearance upon the market.

Another object is to provide an auxiliary seat having novel means for retaining the same in position and against sliding or slippage when used upon the seat of an automobile.

A further object is to provide an auxiliary seat which will readily conform to an irregular surface yet offer a comfortable surface to the occupant.

These and other objects and advantages residing in the specific details of construction will become apparent upon consideration of the following detailed description when considered in connection with the accompanying drawing. The invention is defined in the appended claim and while I have only shown a single form of the invention for the purpose of illustration it is contemplated that changes in shape and construction will readily occur to those skilled in the art coming within the spirit of the present invention. For this reason I do not wish to limit myself to the exact construction shown.

Figure 3:
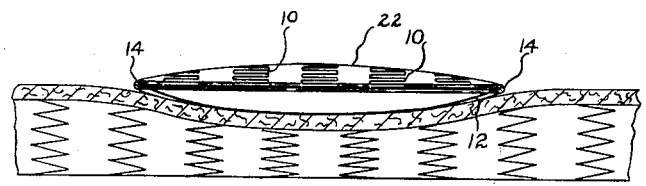
Figure 2:
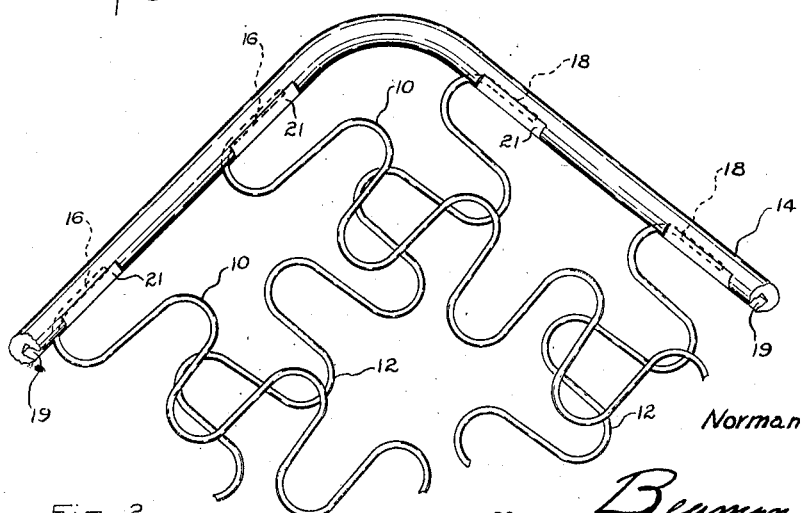

In the drawing:

Fig. 1 is a perspective view of an auxiliary cushion seat and back embodying the present invention, a portion thereof being shown in broken cross-section, Fig. 2 is a fragmentary view of my improved auxiliary seat, and Fig. 3 is a cross-sectional view through either a seat or back cushion of an automobile showing the manner in which my improved spring structure functions.

The spring unit of my improved auxiliary seat may be used as a cushion seat or back or in a combination cushion seat and back. Preferably the spring unit is fabricated from sinuous flat springs disposed in opposite sides of a central frame 14. The springs 10 and 12 may be of the construction shown in U. S. Patent No. 2,002,399 and when assembled in the central frame 14 are bowed in opposite directions. The frame 14 may be of any suitable construction such as a channeled rod within which the ends 16 and 18 of the springs 10 and 12, respectively, are clamped by distorting the channel 19 inwardly as at 21. To upholster the spring unit it may be sewed within a fabric pocket which is preferably of open mesh weave to permit free circulation of air into and out of the interior of the spring unit due to the variations in compression of the springs 10 and 12 by the occupant accompanying normal operation of the automobile. In the construction shown in Fig. 1 the combination cushion seat and back is provided with pockets 20 and 22 into which the spring units are inserted and secured in position by lines of stitching 23 and 25. The pockets 20 and 22 may be connected in spaced relation by a fabric web portion 24 which preferably is of single ply to readily define the fold line between the two pockets to enable the auxiliary seat to be adjusted to the contour of the seat construction.

For holding the auxiliary seat in position and against shifting or slippage when in use on the seat of an automobile or the like a depending apron 26 is provided which may be formed as a continuation of one side of either of the pockets 20 and 22. This apron 26 may be forced down between the cushions of the main seat. If desired a bead 28 may be provided along the edge of the apron 26 to increase its resistance against removal from between the cushions.

The action of my improved auxiliary seat construction will become apparent from inspection of Fig. 3 wherein a cross-section is shown through the spring unit of my auxiliary seat and the cushion seat or cushion back of an automobile seat. The section is drawn to illustrate a spring unit under partial compression and being forced into the cushion as due to the weight of the occupant. It will be noted that because of the curvature of the springs 12 that even when compressed by the weight of the occupant there is a substantial air space between the cushion upon which the auxiliary seat is supported and the surface of the auxiliary seat supporting the occupant. In addition both sets of springs 10 and 12 function to give resilient support and at the same time upon alternate compression and extension due to the coarse weave of the fabric structure defining the pockets 20 and 22 a bellows action results which causes air to flow in and be forced out giving adequate ventilation to parts of the body of the occupant engaging with the auxiliary seat structure.

In Fig. 1 is shown a suitable light, porous, compressible filler or padding 30 inserted between the springs 10 and 12 to add body and softness to the spring unit and to prevent any clicking between the springs 10 and 12 under extreme conditions of compression. In the seat unit shown inserted in the pocket 22 of Fig. 1 the padding 30 is shown broken away to expose the lower springs 12. In the section shown in Fig. 3 the filler 30 has been omitted for the sake of clarity.

An additional feature residing in the construction of my improved spring unit is found in the fact that where the auxiliary seat is to be imposed upon an irregular surface because of the downwardly bowed construction of the springs 12 the lower portion of the seat will adjust itself to the irregular supporting surface at the same time the upper and outer portion of the seating surface defined by the springs 10 will offer a uniform and comfortable supporting surface to the occupant.

Having thus described my invention what I desire to protect by Letters Patent and claim is:

A ventilated auxiliary seat designed to be supported upon an upholstered spring cushion seat surface and to receive the weight of an adult person comprising a generally rectangular border frame member of relatively rigid construction having channel portions defined therein, bowed springs spaced along the sides of said frame and extending between the sides of said frame having their opposite ends fixed in said channel portions, certain of said springs being bowed upwardly and others of said springs being bowed downwardly to provide oppositely crowned surfaces above and below the plane of said border frame, said springs being of undulated shape with the undulations disposed in the crowned surfaces, an open work flexible material covering said crowned surfaces, said springs upon compression being urged toward the plane of said border frame and upon extension moving away from said plane whereby a bellows action takes place producing a free circulation of air into and out of the seat structure, said frame being sufficiently rigid to resist the compression action of said springs, the spacing of said springs and the outer surface thereof defining crowned surfaces of sufficient uniformity and smoothness to enable the seat to be smoothly upholstered entirely by said open work covering.

NORMAN E. MacEWAN.